US009304749B2

(12) United States Patent
Qi et al.

(10) Patent No.: US 9,304,749 B2
(45) Date of Patent: Apr. 5, 2016

(54) METHOD AND SYSTEM FOR INSTRUCTION SCHEDULING (71) Applicant: MARVELL WORLD TRADE LTD, St. Michael (BB)

(72) Inventors: Xinyu Qi, Shanghai (CN); Ningsheng Jian, Shanghai (CN); Haitao Huang, Shanghai (CN); Liping Gao, Shanghai (CN)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 14/472,042

(22) Filed: Aug. 28, 2014

(65) Prior Publication Data

US 2015/0074675 A1 Mar. 12, 2015

Related U.S. Application Data (60) Provisional application No. 61/876,914, filed on Sep. 12, 2013.

(51) Int. Cl.
*G06F 9/45* (2006.01)
*G06F 9/38* (2006.01)

(52) U.S. Cl.
CPC .......... *G06F 8/4435* (2013.01); *G06F 8/433* (2013.01); *G06F 8/443* (2013.01); *G06F 8/4441* (2013.01); *G06F 9/3836* (2013.01); *G06F 9/3838* (2013.01); *G06F 9/3855* (2013.01)

(58) Field of Classification Search
None
See application file for complete search history.

(56) References Cited

U.S. PATENT DOCUMENTS

| 2002/0056078 | A1* | 5/2002 | Inagaki | G06F 8/445 717/155 |
| 2005/0289518 | A1* | 12/2005 | Tanimoto | G06F 17/5045 717/136 |
| 2008/0052688 | A1* | 2/2008 | O'Brien | G06F 8/443 717/140 |
| 2012/0204163 | A1* | 8/2012 | Marathe | G06F 8/4442 717/151 |

OTHER PUBLICATIONS

International Search Report and Written Opinion issued Jun. 9, 2015 in PCT/IB2014/002630.
Anonymous, "Register renaming—Wikipedia, the free encyclopedia" Retrieved from the Internet: http://en.wikipedia.org/w/index.php?title=Register_renaming&oldid=570804203 [Retrieved on Apr. 14, 2015] , XP055183008, Aug. 30, 2013, 8 Pages.

* cited by examiner

*Primary Examiner* — Jason Mitchell
*Assistant Examiner* — Mark Gooray (57) ABSTRACT Aspects of the disclosure provide a method for instruction scheduling. The method includes receiving a sequence of instructions, identifying redundant flag-register based dependency of the instructions, and re-ordering the instructions without being restricted by the redundant flag-register based dependency.

17 Claims, 7 Drawing Sheets

```
//A is a first vertex representing the first instruction in the pair
//B is a second vertex representing the second instruction in the pair
if A is a use and NEED_CHECK_FLAG
    if B is a def
        draw an edge (A->B), set MARK2  // flag-register dependency for "use, def"    ← 310
    else if B is a use  // unnecessary flag-register dependency for "use, use"       ← 320
        if MARK2 is set, clear NEED_CHECK_FLAG
else if A is def and NEED_CHECK_FLAG
    if B is use
        if MARK1 is set
            draw edge for (A->LAST_DEF), clear NEED_CHECK_FLAG                        ← 330
        else draw edge (A->B), set MARK2  // flag-register dependency for "def, use"
    else if B is def
        if MARK2 is set  // unnecessary flag-register dependency for the first two def in "def, def, def,..."  ← 340
            clear NEED_CHECK_FLAG
        else
            LAST_DEF = B, set MARK1
```

*Fig. 3*

```
A1: add-int        v2, v1, v17    ⎫
A2: aget-wide      v3, v16, v2    ⎬ 461
A3: add-int        v5, v1, v14    ⎫
A4: aget-wide      v5, v13, v5    ⎬ 462
A5: mul-double     v5, v11        ← 464
A6: add-double     v3, v5         ← 465
A7: aput-wide      v3, v16, v2
A8: add-int/lit8   v1, v1, #1
                   (-10)
A9: goto           v1, v10, (+11)
A10: if-ge
```

```
01:  adds    r9, r2, r4
02:  adds    r10, r0, r9, lsl 3      ⎫
03:  vldr    d9, [r10, #16]          ⎬ 581
04:  adds    r12, r2, r11            ⎫
05:  adds    r3, r8, r12, lsl 3      ⎬ 582
06:  vldr    d10, [r3, #16]
07:  vmuld   d10, d10, d8            ← 584
08:  vadd    d9, d9, d10             ← 585
09:  adds    r7, r0, r9, lsl 3
10:  vstr    d9, [r7, #16]
11:  adds    r2, r2, #1
12:  cmp     r2, r1
13:  bge     15
14:  b       01
15:  ...
```

```
01:  adds    r9, r2, r4
02:  adds    r10, r0, r9, lsl 3
03:  adds    r12, r2, r11
04:  adds    r3, r8, r12, lsl 3
05:  vldr    d10, [r3, #16]
06:  vmuld   d10, d10, d8         ← 684
07:  vldr    d9, [r10, #16]
08:  vadd    d9, d9, d10          ← 685
09:  adds    r7, r0, r9, lsl 3
10:  adds    r2, r2, #1
11:  cmp     r2, r1
12:  vstr    d9, [r7, #16]
13:  bge     15
14:  b       01
15:  ...
```

```
01:  adds    r12, r2, r11
02:  adds    r3, r8, r12, lsl 3   ⎫
                                  ⎬ 782
03:  vldr    d10, [r3, #16]       ⎭
                                  ← 784
04:  vmuld   d10, d10, d8
05:  adds    r9, r2, r4
06:  adds    r10, r0, r9, lsl 3   ⎫
                                  ⎬ 781
07:  vldr    d9, [r10, #16]       ⎭
                                  ← 785
08:  vadd    d9, d9, d10
09:  adds    r7, r0, r9, lsl 3
10:  adds    r2, r2, #1
11:  vstr    d9, [r7, #16]
12:  cmp     r2, r1
13:  bge     15
14:  b       01
```

780

782

784

781

785

*Fig. 7*

METHOD AND SYSTEM FOR INSTRUCTION SCHEDULING

INCORPORATION BY REFERENCE

This present disclosure claims the benefit of U.S. Provisional Application No. 61/876,914, "Method and System of Mark Friendly Instruction Scheduling for Virtual Machine" filed on Sep. 12, 2013, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, a Java virtual machine, such as Dalvik and the like, compiles frequently used Java bytecode into native code to improve runtime performance. In an example, the Java virtual machine includes a just-in-time compiler that compiles instructions in Java bytecode one by one without changing the order of the instructions.

SUMMARY

Aspects of the disclosure provide a method for instruction scheduling. The method includes receiving a sequence of instructions, identifying redundant flag-register based dependency of the instructions, and re-ordering the instructions without being restricted by the redundant flag-register based dependency.

To identify the redundant flag-register based dependency, in an embodiment, the method includes identifying the redundant flag-register based dependency based on pre-determined patterns for flag-register access. In an example, the method includes identifying two or more consecutive read flag-register accesses of the flag register. In another example, the method includes identifying three or more consecutive write flag-register accesses.

In an embodiment, the method includes receiving the sequence of instructions for compilation, and outputting compiled code that has been reordered. In another embodiment, the method includes receiving the sequence of instructions for an execution, and controlling the execution according to the re-ordered instructions.

In an embodiment, to reorder the instructions without being restricted by the redundant flag-register based dependency, the method includes constructing a directed graph with vertexes and edges between the vertexes. The vertexes correspond to instructions and the edges are latency labelled and correspond to data dependencies and non-redundant flag dependencies. Then, the method includes topology-sorting the directed graph according to a critical latency-oriented model to reduce an execution latency.

Aspects of the disclosure provide a non-transitory computer readable medium storing program instructions for causing a processor to execute operations for instruction scheduling. The operations include receiving a sequence of instructions, identifying redundant flag-register based dependency of the instructions, and reordering the instructions without being restricted by the redundant flag-register based dependency.

Aspects of the disclosure provide an apparatus that includes a processor and a memory. The processor is configured to execute instructions. The memory is configured to store instructions for causing the processor to receive a sequence of instructions, identify redundant flag-register based dependency of the instructions in the sequence, and reorder the instructions without being restricted by the redundant flag-register based dependency relationship.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
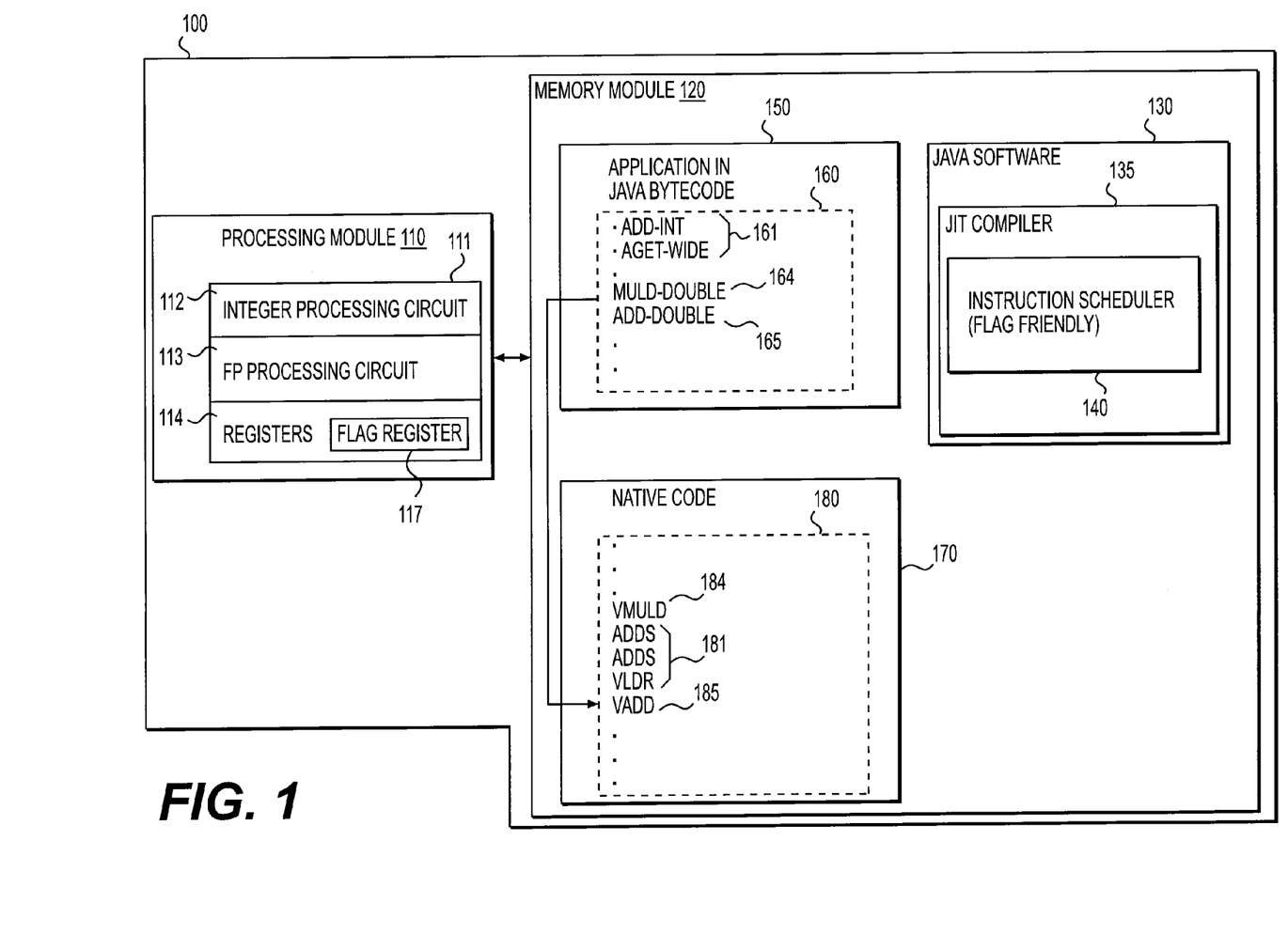
FIG. 1 shows a block diagram of a system example 100 according to an embodiment of the disclosure.

FIG. 1 shows a block diagram of a system example 100 according to an embodiment of the disclosure. The system 100 includes hardware components, such as a processing module 110, a memory module 120, and the like, and software components, such as various code instructions stored in the memory module 120. The hardware components operate according to the software components to perform various tasks. The system 100 is configured to perform a flag friendly instruction scheduling to reorder instructions for execution. For example, the system 100 identifies redundant flag-register dependencies in instructions that are unnecessary, and ignores the redundant flag register dependency during instruction scheduling to expand scheduling scope, increase scheduling flexibility and improve scheduling performance.

According to an aspect of the disclosure, the flag friendly instruction scheduling can be performed in hardware and software. In an example, the flag friendly instruction scheduling is implemented in hardware, such as a control circuit for out of order execution control in a central processing unit (CPU), and the like. In another example, the flag friendly instruction scheduling is implemented in various compilation software, such as a static compilation software, a dynamic compilation software, and the like. In the FIG. 1 example, the flag friendly instruction scheduling is implemented in a just-in-time (JIT) compiler 135 for dynamic compilation.

Specifically, in the FIG. 1 example, the system 100 can be any suitably system, such as a desktop computer, a laptop computer, a tablet computer, a smart phone, and the like. The system 100 can include other suitable components (not shown), such as a display, a touchscreen, a microphone, a communication component, and the like. In an embodiment, the system 100 includes a single integrated circuit (IC) chip that integrates various circuits, such as the processing module 110, the memory module 120, and the like on the single IC chip. In another embodiment, the system 100 includes multiple IC chips, such as a processor chip, a memory chip and the like that are suitably coupled together.

The processing module 110 includes one or more processors, such as a central processing unit (CPU) 111, and the like, to execute various code instructions to perform various tasks. The code instructions can be low level code, such as machine code (native code), that can be directly executed by the CPU 111 or can be high level code, such as in Java language, in C language and the like, that can be translated into the machine code and then executed.

The CPU 111 can be implemented using any suitable architecture, such as x86, ARM, and the like. In an example, when the CPU 111 has the x86 architecture, the CPU 111 is able to execute machine code in an x86 instruction set that is specific for the x86 architecture. In another example, when the CPU 111 has the ARM architecture, the CPU 111 is able to execute machine codes in an ARM instruction set that is specific for the ARM architecture.

According to an aspect of the disclosure, the CPU 111 includes multiple processing circuits that can operate in parallel. In the FIG. 1 example, the CPU 111 includes an integer processing circuit 112, such as an arithmetic logic unit (ALU) and the like, and a floating point (FP) processing circuit 113, such as a floating point multiplier and the like. Thus, in an example, when integer operations and floating point operations do not have dependency relationship, the integer operations and the floating point operations can be executed respectively by the integer processing circuit 112 and the FP processing circuit 113 in parallel. In an embodiment, the CPU 111 is configured to use a pipeline architecture to support instruction pipelines, and instructions can be re-ordered to improve parallelism, and reduce latency.

According to an aspect of the disclosure, the CPU 111 includes various registers 114 for various purposes, such as data register, base register, stack pointer register, flag register, and the like. Each instruction performs a specific task, such as a load, a jump, an arithmetic operation, a logic operation, and the like on data in the registers and/or the memory module 120. Specifically, in the FIG. 1 example, the flag register 117 is the status register for the CPU 111 that contains the current state of the CPU 111. For example, the flag register includes zero flag, carry flag, sign flag, overflow flag, and the like that are set or cleared as effects of CPU executions of instructions, such as arithmetic and bit manipulation operations and the like. In addition, the CPU executions of the instructions also depend on the state information stored in the flag register.

The memory module 120 includes one or more storage media that provide memory space for various storage needs. In an example, the memory module 120 stores code instructions to be executed by the processing module 110 and stores data to be processed by the processing module 110. In another example, the memory module 120 includes memory spaces allocated for system storage, and includes memory spaces allocated for user storage.

The storage media include, but are not limited to, hard disk drive, optical disc, solid state drive, read-only memory (ROM), dynamic random access memory (DRAM), static random access memory (SRAM), flash memory, and the like.

According to an aspect of the disclosure, the memory module 120 stores various computer programs, such as system programs, user application programs, and the like. Each computer program includes code instructions to be executed to perform a task.

In the FIG. 1 example, a memory space 130 is allocated in the memory module 120 to store a Java software program that is suitable for the system 100. The Java software program is installed in the system 100 to provide a Java runtime environment (JRE), such that Java bytecode can be executed in the system 100. In an example, the Java software program is executed to start a Java virtual machine in the system 100 for executing Java bytecode. In an example, the system 100 is an Android system, and the memory space 130 stores Dalvik software program for the Android system.

In an embodiment, source code of a user application program is generated in Java language. The source code is compiled to generate Java bytecode for the user application. The Java bytecode is executable by various Java virtual machines. In the FIG. 1 example, a memory space 150 is allocated to store Java bytecode for the user application. To execute the Java bytecode, the system 100 starts the Java virtual machine. In an example, the CPU 111 executes the Java software at the memory space 130 to start the Java virtual machine. The Java virtual machine provides a Java runtime environment for the Java bytecode. After the execution of the Java bytecode, the Java virtual machine is terminated in an example.

According to an aspect of the disclosure, the Java virtual machine uses interpretation and just-in-time (JIT) compilation for Java bytecode execution. In an example, the Java virtual machine detects frequently executed traces, such as paths, loops, and the like, in the Java bytecode, and executes the frequently executed traces in a different manner from the less frequently executed traces. The Java virtual machine tracks a number of executions for a trace. When the number of executions for the trace is less than a threshold (e.g., two), the Java virtual machine executes the trace by interpretation; and when the number of executions for the trace is equal or larger than the threshold, the JIT compiler 135 compiles the trace of Java bytecode into a trace of native code, and caches the trace of native code in the memory module 120. Generally, instructions in a loop are frequently executed, and the JIT compiler 135 compiles instructions in the loop into native code, and caches the native code.

In the FIG. 1 example, a memory space 170 is allocated as a JIT cache to cache the compiled native code. Then, for further executions of the trace, the Java virtual machine executes the cached native code stored at the memory space 170.

According to an aspect of the disclosure, the JIT compiler 135 includes an instruction scheduler 140 configured to re-order instructions to improve parallelism and reduce latency. In the FIG. 1 example, a sequence of instructions 160 in Java bytecode includes two instructions 164 and 165 on a critical latency path of the instructions 160, and other instructions, such as instructions 161. For example, the instruction 164 is a floating point multiplication instruction, the instruction 165 is a floating point addition instruction that use the multiplication result from the instruction 164, and the instructions 161 are integer operations. The instruction 165 needs to wait for the result from the instruction 164, and the instruction 164 is a time-consuming instruction, and may take for example, multiple clock cycles. In the example, although the instructions 161 are ahead of the instruction 164, the instruction 164 does not have data dependency on the instructions 164.

In an embodiment, the instruction scheduler 140 is implemented in low-level intermediate representation. The instruction scheduler 140 causes the instructions 160 in Java bytecode to be compiled into reordered instructions 180 in the native code. In the FIG. 1 example, the instruction 164 is translated into instruction 184, the instruction 165 is translated into instruction 185, and the instructions 161 are translated into instructions 181. Further, the instructions 181 are moved between the instruction 184 and the instruction 185. Thus, in an example, the instruction 184 and the instructions 181 can be executed respectively by the FP processing circuit 113 and the integer processing circuit 112 in parallel to hide the latency between the instruction 184 and the instruction 185. The reordered instructions 180 are executed by the Java virtual machine with reduced latency.

According to an aspect of the disclosure, the instruction scheduler 140 is configured to determine dependency relationships between instructions, and re-order the instructions according to the dependency relationship, for example, not to violate the dependency relationship. In an embodiment, the instruction scheduler 140 determines both data dependency and flag-register dependency between instructions.

In an embodiment, three types of data dependencies are considered. They are a read after write (RAW) type, a write after read (WAR) type, and a write after write (WAW) type. When a first instruction writes to a memory (e.g., a memory address allocated to a variable, a register and the like) that is read later by a second instruction, the first and second instructions have the RAW type data dependency. When a first instruction reads a memory (e.g., a memory address allocated to a variable, a register and the like) that is written later by a second instruction, the first and second instructions have the WAR type data dependency. When two instructions write to the same memory (e.g., a memory address allocated to a variable, a register and the like), the two instructions have the WAW type data dependency. When the two instructions have a data dependency relationship, the order of the two instructions needs to be maintained.

According to an aspect of the disclosure, the instruction scheduler 140 identifies redundant flag-register dependency between instructions that are unnecessary, and re-orders the instructions without being restricted by the redundant flag-register dependency. In an embodiment, certain instruction set, such as the ARM architecture based Thumb instruction set, and the like, heavily sets/clears the flag register, and creates unnecessary flag-register dependency. The unnecessary flag-register dependency can shrink scheduling space, and harm scheduling effectiveness.

According to an aspect of the disclosure, when an instruction sets/clears the flag register, the instruction is a "def" instruction that writes the flag register to define the flags in the flag register, and when an instruction uses the information in the flag register, the instruction is a "use" instruction that reads the flag register to use the flags in the flag register. In an embodiment, the instruction scheduler 140 identifies consecutive "def" instructions and consecutive "use" instructions to identify the redundant flag-register dependency. For example, when the instruction scheduler 140 identifies three or more consecutive "def" instructions, except the last "def" instruction, the flag-register dependencies of the consecutive "def" instructions are redundant. In another example, when the instruction scheduler 140 identifies two or more consecutive "use" instructions, the flag-register dependencies of the consecutive "use" instructions are redundant.

In an example, a sequence of nine instructions has the following flag register dependency: "def, def, def, use, def, def, use, use, def". In this example, the first three instructions are consecutive "def" instructions, and the flag register dependency of the first two instructions is redundant, and unnecessary. The first two instructions can exchange order without affecting execution correctness when the first two instructions do not have data dependency relationship.

Further, in the example, the seventh and eighth instructions form consecutive "use" instructions, and the flag-register dependency of the seventh and eighth instructions are redundant. The seventh and eighth instructions can exchange their order without affecting execution correction when the two instructions do not have data dependency relationship.

According to an aspect of the disclosure, the instruction scheduler 140 constructs a dependency graph that considers both data dependency and flag-register dependency. The dependency graph is a directed graph where each vertex represents an instruction. An edge from a first vertex to a second vertex in the dependency graph represents a dependency relationship of a second instruction represented by the second vertex to a first instruction represented by the first vertex. In an example, the edge is labelled with latency of dependence. For example, the latency of dependence is the number of clock cycles that needs to elapse for processing the first instruction before the pipeline can proceed with the second instruction. In an example, the number of clock cycles is determined according to an ARM architecture instruction timing model, such as Cortex-A9 instruction timing model, Cortex-A7 instruction timing model, and the like.

Further, the instruction scheduler 140 re-orders the instructions according to the dependency graph. In an embodiment, the instruction scheduler 140 uses a topology sorting algorithm to sort the dependency graph, and recorder the instructions to achieve execution correctness and to achieve reduced execution latency. For example, when two vertexes are connected by a directed edge, the topology sorting algorithm maintains the order of the two instructions represented by the two vertexes. Further, when the directed edge has a relatively large latency, the topology sorting algorithm re-orders the instructions to move movable instructions between the two instructions represented by the two vertexes to hide latency. It is noted that when redundant flag-register dependencies are ignored, more movable instructions are available to hide the relatively large latency.

It is noted that the memory module 120 can have memory spaces allocated for other suitable module. In an example, a memory space (not shown) is allocated in the memory module 120 to store a program for a kernel. The kernel is a part of an operating system for the system 100 that interfaces user application programs with the hardware components of the system 100. For example, the kernel manages input/output requests from software components, such as the user application programs and the like, and translates them into data processing instructions for the hardware components, such as the processing module 110, the memory module 120 and the like.

Figure 2:
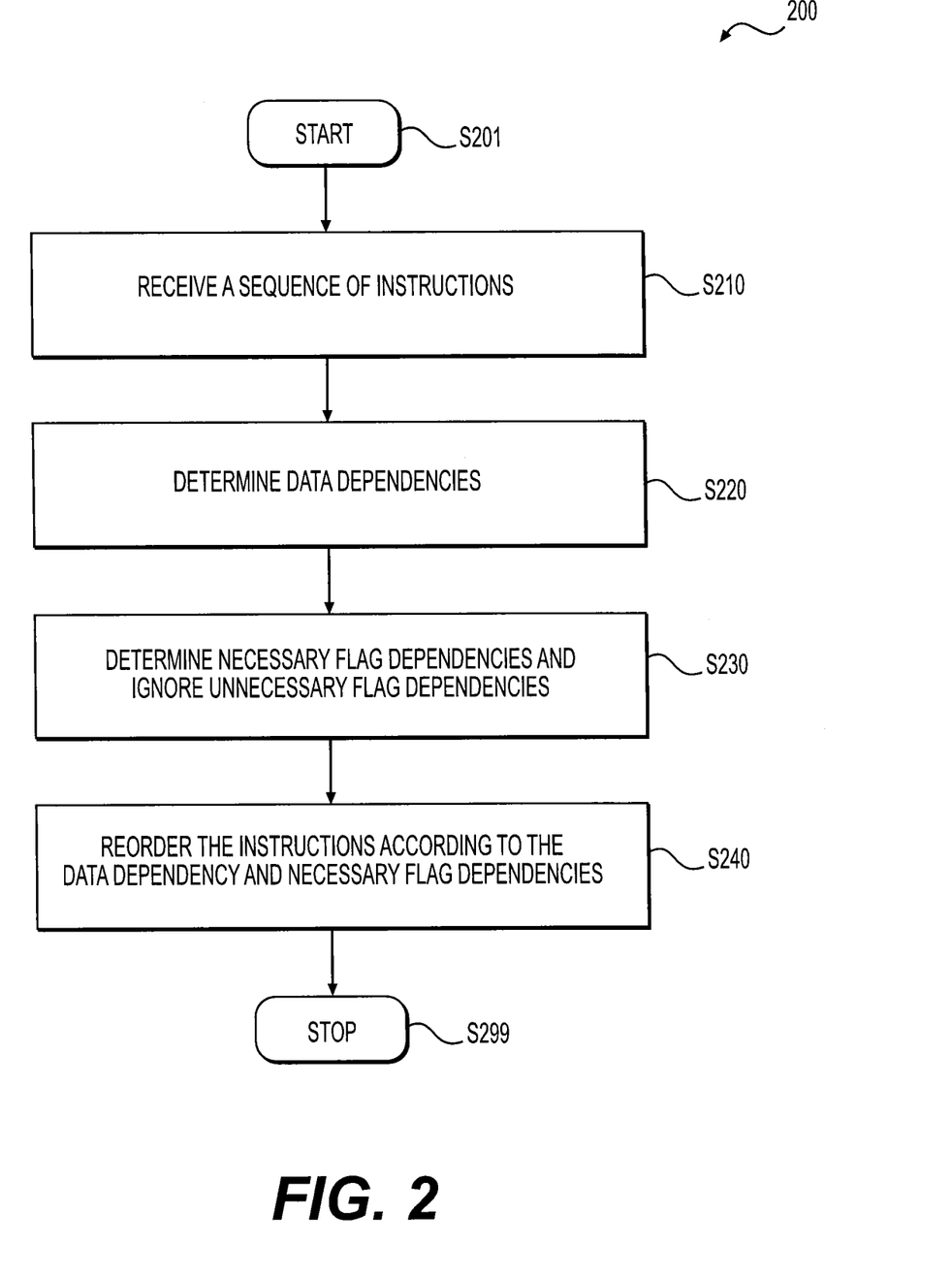
FIG. 2 shows a flow chart outlining a process example 200 according to an embodiment of the disclosure.

FIG. 2 shows a flow chart outlining a process example 200 according to an embodiment of the disclosure. In an example, an application program in Java language is translated into Java bytecode, and the Java bytecode is stored at the memory space 150 in the memory module 120 in the FIG. 1 example. In an embodiment, to execute the Java bytecode, the CPU 111 executes the Java software program stored at the memory space 130 to start the Java virtual machine. The Java virtual machine provides Java runtime environment for executing the Java bytecode. In an example, the Java virtual machine uses the JIT compiler 135 to compile a frequently used instruction block, such as a loop in Java bytecode, and the like, into native code, and the Java virtual machine executes the compiled native code to improve performance. In the example, the CPU 111 executes the instruction scheduler 140 to perform flag friendly instruction scheduling according to the process 200. The process starts at S201 and proceeds to S210.

At S210, a sequence of instructions is received. In the FIG. 1 example, the Java virtual machine receives a sequence of instructions 160, such as instructions for a hot loop and the like, for execution.

At S220, data dependencies of the instructions are determined. In an example, the instruction scheduler 140 causes the CPU 111 to construct a dependency graph based on the data dependencies, such as the RAW, WAW and WAR types of data dependencies. In an embodiment, the dependency graph is a directed graph where each vertex represents an instruction. An edge from a first vertex to a second vertex in the dependency graph represents a data dependency relationship of a second instruction represented by the second vertex to a first instruction represented by the first vertex. In an example, the edge is labelled with latency of dependence. For example, the latency of dependence is the number of clock cycles that needs to elapse for processing the first instruction before the pipeline can proceed with the second instruction. In an example, the latency of the dependence is determined based on the instruction set and the architecture of processing circuit in the processing module 110.

Figure 3:
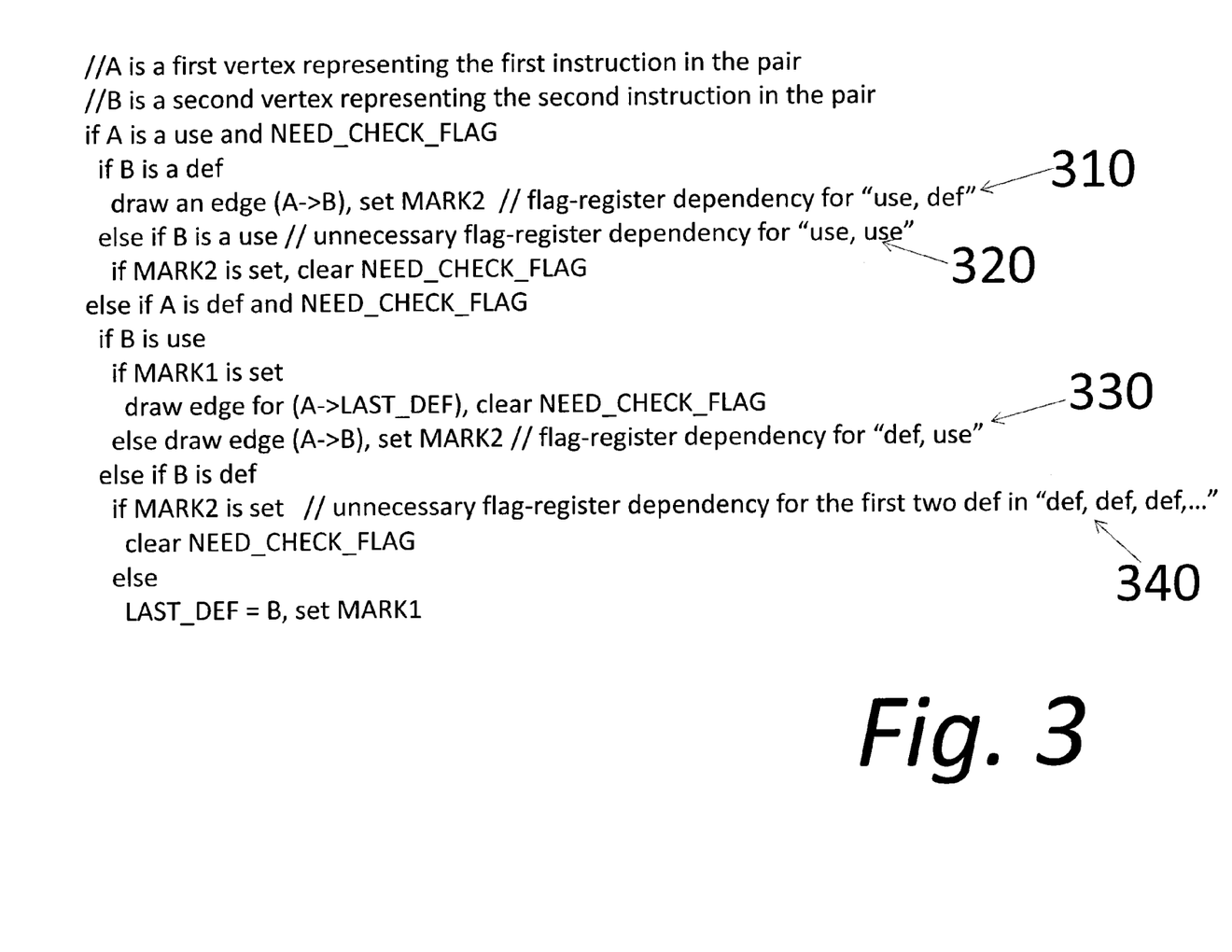
FIG. 3 shows an example of pseudo code for identifying redundant flag-register dependency according to an embodiment of the disclosure.

At S230, flag dependencies of the instructions are determined. In the FIG. 1 example, the instruction scheduler 140 causes the CPU 111 to further construct the dependency graph based on non-redundant flag-register dependencies. In an embodiment, the instruction scheduler 140 identifies redundant flag-register dependencies, and ignores the redundant flag-register dependencies for constructing edges in the dependency graph. FIG. 3 shows a pseudo code example that can be used by the instruction scheduler 140 to identify redundant flag-register dependencies, and construct edges in the dependency graph without being restricted by the redundant flag-register dependencies.

At S240, the instructions are re-ordered according to a latency-oriented model. In the FIG. 1 example, the instruction scheduler 140 causes the CPU 111 to perform topology sorting on the dependency graph to re-order the instructions. When there is an edge between two vertexes, the instructions represented by the two edges cannot switch order. Because the redundant flag-register dependencies are identified and are not used to construct edges in the dependency graph, the topology sorting is not restricted by the redundant flag-register dependencies. Thus, the instruction schedule 140 has more flexibility to re-order the instructions to hide latency. In the FIG. 1 example, the JIT compiler 135 generates the compiled instructions 180 that are re-ordered to hide latency. The compiled instructions 180 are stored in the JIT cache for the CPU 111 to execute. Then, the process proceeds to S299 and terminates.

It is noted that any suitable algorithm can be used to build the dependency graph. In an embodiment, a dynamic compiler, such as the JIT compiler 135, constructs a dependency graph for a frequently used trace during dynamic compilation. Because compiling time is critical for dynamic compiler, the dependency graph needs to be constructed with relatively low complexity.

In an example, for a sequence of N instructions (N is a positive integer), an algorithm with complexity $O(N^2)$ is used to construct the dependency graph. Specifically, the algorithm initiates N vertexes corresponding to the N instructions $(I_1, I_2, \ldots, I_N)$ in a dependency graph. Then, the algorithm scans each pair of instructions $(I_X, I_Y)$ (X and Y are positive integers that satisfy 1<=X<Y<=N), and determines whether the pair of instructions has data dependency and/or non-redundant flag-register dependency. When the pair of instructions has data dependency and/or non-redundant flag-register dependency, an edge is constructed between the two vertexes corresponding to the two instructions.

In another example, the algorithm constructs first edges due to data dependency, and then constructs second edges due to non-redundant flag-register dependency. To construct the second edges due to the non-redundant flag-register dependency, for each instruction $I_X$, the algorithm checks instruction pairs that start with $I_X$ sequentially, for example, in the order of $(I_X, I_{X+1}), (I_X, I_{X+2}), \ldots, (I_X, I_N)$.

Specifically, for each starting instruction $I_X$, the algorithm initiates NEED_CHECK_FLAG to be true, MARK2 to be false and MARK1 to be false. Then, the algorithm checks each instruction pair starting with $I_X$ sequentially in the order of $(I_X, I_{X+1}), (I_X, I_{X+2}), \ldots, (I_X, I_N)$ to construct edges due to non-redundant flag-register dependency.

FIG. 3 shows an example of pseudo code for checking a pair of instructions to construct an edge due to non-redundant flag-register dependency according to an embodiment of the disclosure. The pseudo code can be used respectively to sequentially check $(I_X, I_{X+1}), (I_X, I_{X+2}), \ldots, (I_X, I_N)$ to construct edges due to non-redundant flag-register dependency.

In the FIG. 3 example, the pseudo code checks for patterns that are predetermined to be redundant flag-register dependency or non-redundant flag-register dependency. For example, the pseudo code checks for a pattern "use, def" that is pre-determined to be non-redundant flag-register dependency. When the two instructions have the pattern "use, def", an edge is constructed between two vertexes in the dependency graph corresponding to the two instructions, as shown by 310 in FIG. 3.

In another example, the pseudo code checks for a pattern "def, use" that is pre-determined to be non-redundant flag-register dependency. When the two instructions have the pattern "def, use", an edge is constructed between two vertexes in the dependency graph corresponding to the two instructions, as shown by 330 in FIG. 3.

In another example, the pseudo code checks for a pattern of consecutive "use", such as "use, use", that is pre-determined to be redundant flag-register dependency. When two instructions has the pattern "use, use", no need to construct an edge between two vertexes in the dependency graph corresponding to the two instructions, as shown by 320 in FIG. 3.

In another example, the pseudo code checks for a pattern of three or more consecutive "def". Except for the last instruction, the other instructions have redundant flag-register dependency. For example, for a pattern of "def, def, def", the first two "def" instructions are pre-determined to be redundant flag-register dependency, and no edge is constructed between vertexes corresponding to the first two "def" instructions, as shown by 340 in FIG. 3.

FIGS. 4-7 show examples for Java bytecode translation according to an embodiment of the disclosure.

Figure 4:
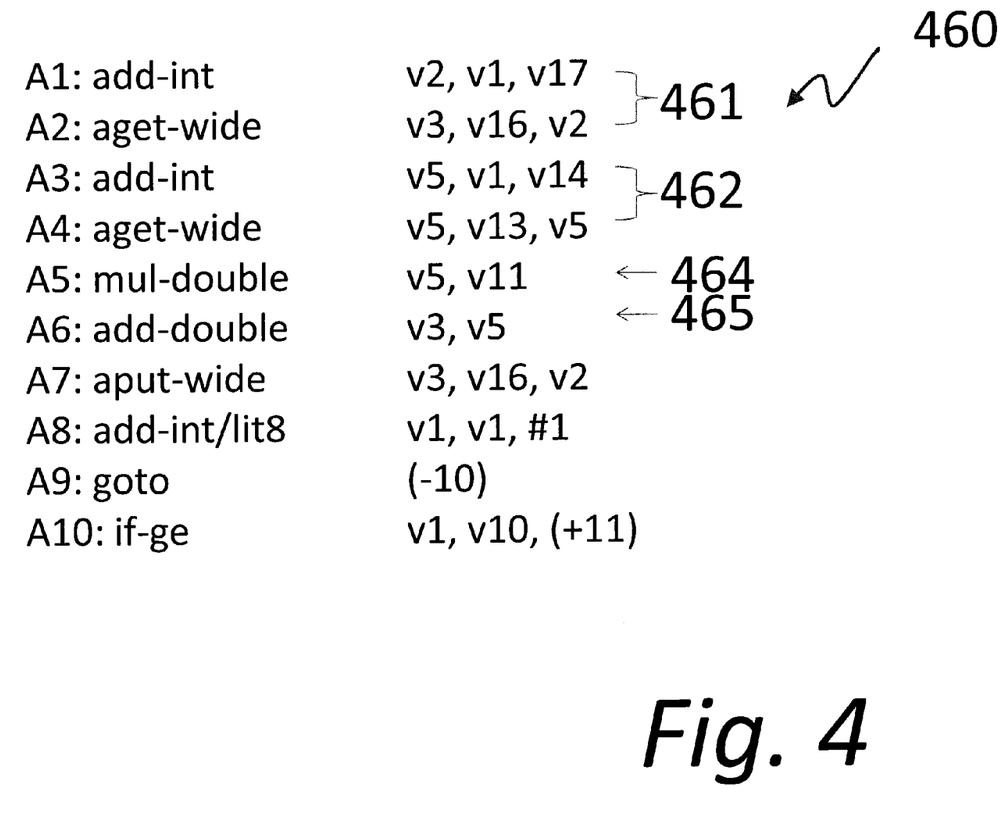
FIG. 4 shows an example of Java bytecode 460.

FIG. 4 shows an example of Java bytecode 460. The Java bytecode 460 is a hot loop that needs to be frequently executed. In the Java bytecode 460, instructions 461 and 462 are integer operations, instructions 464 and 465 are floating point operations.

Figure 5:
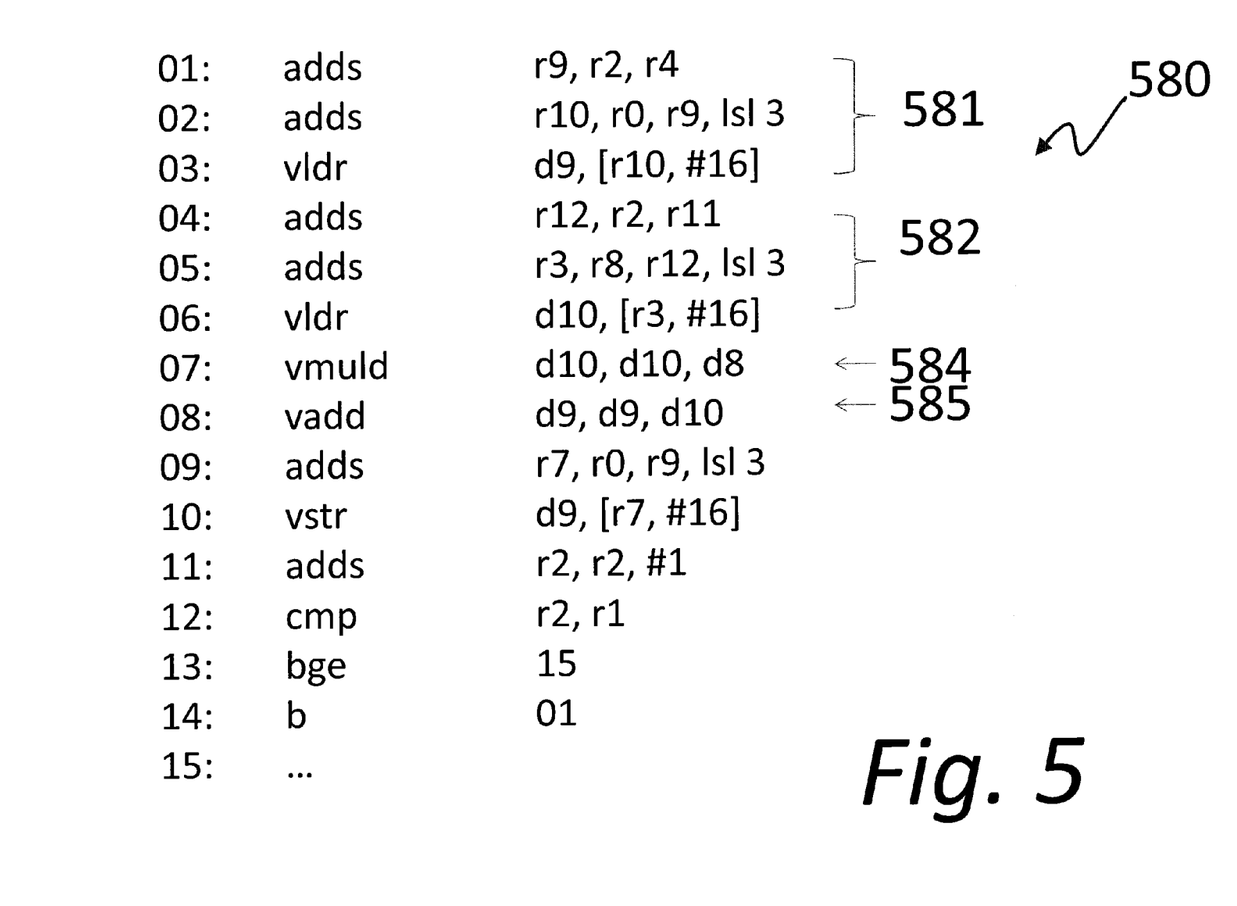
FIGS. 5-7 show examples of native code 580, 680 and 780 corresponding to the Java bytecode 460 according to an embodiment of the disclosure.

FIG. 5 shows an example of native code 580 corresponding to the Java bytecode 460. The Java bytecode 460 is translated into the native code 580 of Thumb instruction set without instruction scheduling. For example, the instructions 461 are translated into instructions 581, the instructions 462 are translated into instructions 582, the instructions 464 are translated into instructions 584, and the instructions 465 are translated into instructions 585. The instructions 581, 582, 584 and 585 have the same order as the instructions 461, 462, 464 and 465. It is noted that, for Thumb instruction set, instructions, such as "adds" and the like, frequently set/clear the flag register. It is noted that "vmuld" instruction (at 07) is a floating point multiplication that takes a relatively large number of clock cycles to execute. It is also noted that the "vadd" instruction (at 08) has data dependency on the "vmuld" instruction. Thus, the latency for the dependency relationship between the "vmuld" instruction and the "vadd" instruction is relatively large. In the FIG. 5 example, the "vmuld" instruction and the "vadd" instruction are on a critical latency path.

Figure 6:
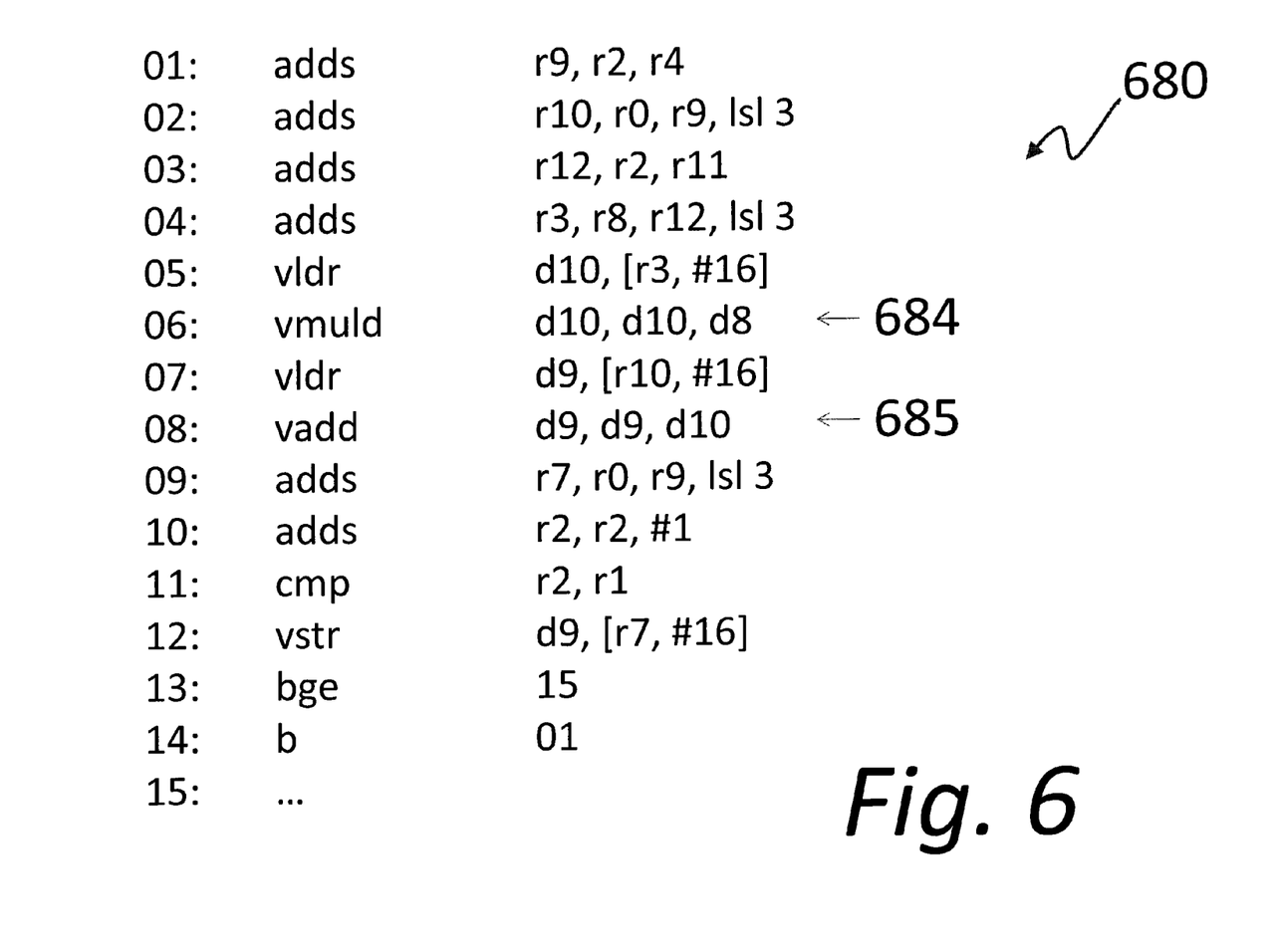

FIG. 6 shows an example of native code 680 corresponding to the Java bytecode 460. The Java bytecode 460 is translated into the native code 680 of Thumb instruction set with instruction scheduling that is restricted due to redundant flag-register dependency. In an example, the native code 580 is re-ordered without ignoring the redundant flag-register dependency. In the example, a large number of instructions in the Thumb instruction set, such as the instruction "adds", update the flag register and thus has flag-register dependencies. Due to the large number of instructions having flag-register dependencies, the scheduling scope is limited. In the FIG. 6 example, a "vldr" instruction which does not access flag-register, is able to be moved between the "vmuld" instruction and the "vadd" instruction to hide a portion of the latency between the two instructions.

Figure 7:
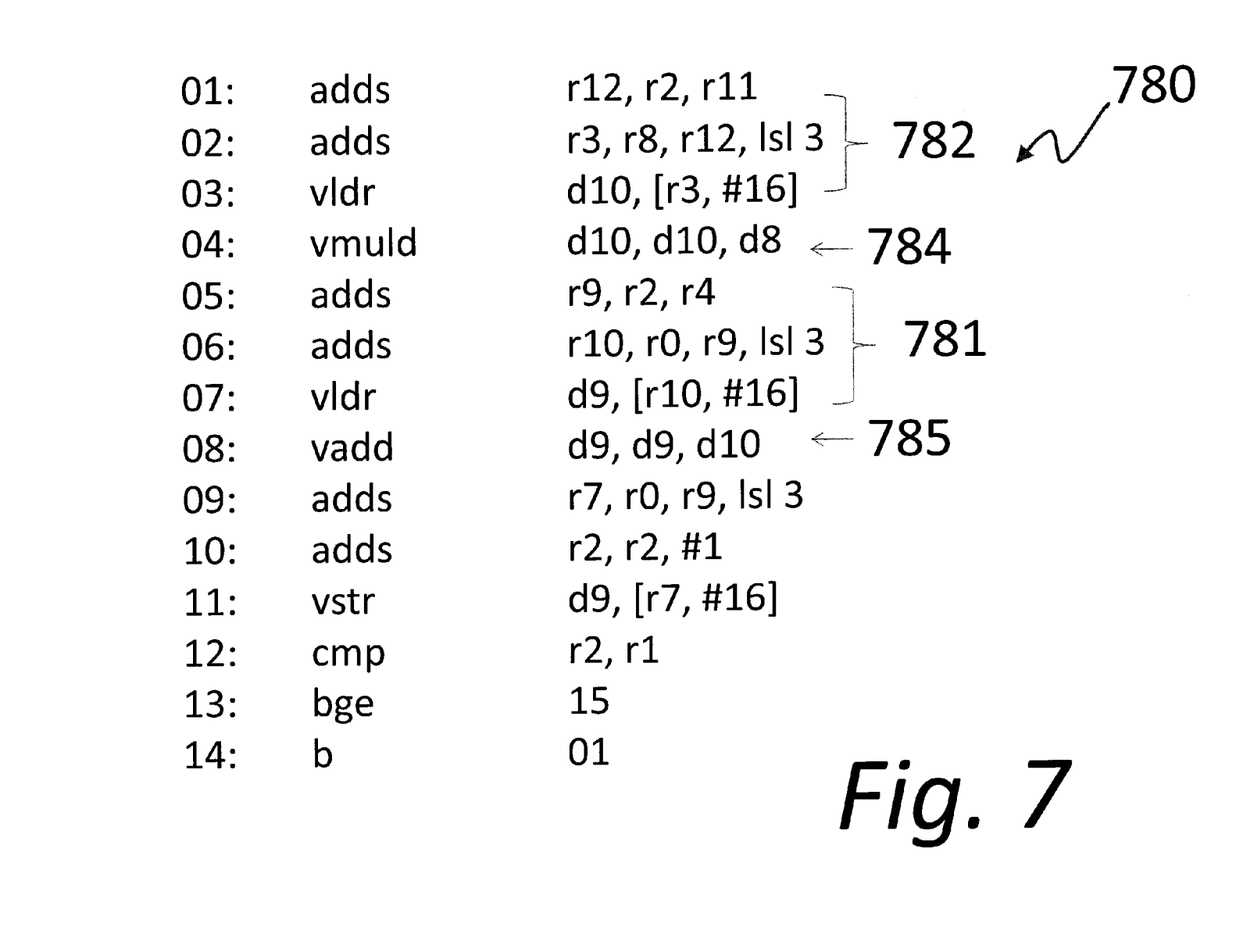

FIG. 7 shows an example of native code 780 corresponding to the Java bytecode 460. The Java bytecode 460 is translated into the native code 780 with instruction scheduling that is not restricted by the redundant flag-register dependency. In an example, the native code 580 is reordered with the redundant flag-register dependency being ignored. In the example, the instructions from line 01 to line 11 are either "def" instructions or no-flag register access instructions. Thus, the flag-register dependencies of the instructions from line 01 to line 10 are redundant, and the redundant flag-register dependencies can be ignored during instruction scheduling to improve scheduling flexibility. Thus, when the instructions do not have data dependency, the order of the instructions can be switched. In the FIG. 7 example, the instructions 781 do not have data dependency with the instructions 782 and the instruction 784, and thus the instructions 781 can be moved after the instruction 784 to hide the latency between "vmuld" instruction and the "vadd" instruction. Thus, the native code 780 has less total execution latency than the native code 580 and the native code 680.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for instruction scheduling, comprising:
receiving a sequence of instructions;
identifying data dependencies between instructions;
identifying a pattern of redundant flag-register read and/or write accesses based on dependency of the instructions; and
re-ordering the instructions, based on data dependencies and ignoring the identified redundant flag-register access dependencies to reduce execution latency, by:
constructing a directed graph with vertexes and edges between the vertexes, the vertexes corresponding to the instructions and the edges being latency labelled and corresponding to data dependencies and non-redundant flag dependencies, and
topology-sorting the directed graph according to a critical latency-oriented model to reduce the execution latency.

2. The method of claim 1, wherein identifying the pattern of redundant flag-register read and/or write accesses based on dependency of the instructions further comprises:
identifying the pattern of redundant flag-register read and/or write accesses based on dependency based on pre-determined patterns for flag-register access.

3. The method of claim 2, wherein identifying the pattern of redundant flag-register read and/or write accesses based on dependency based on the pre-determined patterns for the flag-register access further comprises:
identifying two or more consecutive read flag-register accesses.

4. The method of claim 2, wherein identifying the pattern of redundant flag-register read and/or write accesses based on dependency based on the pre-determined patterns for the flag-register access further comprises:
identifying three or more consecutive write flag-register accesses.

5. The method of claim 1, wherein:
receiving the sequence of instructions for compilation; and
outputting compiled code corresponding to the re-ordered instructions.

6. The method of claim 1, wherein:
receiving the sequence of instructions for an execution; and
controlling the execution according to the re-ordered instructions.

7. A non-transitory computer readable medium storing program instructions for causing a processor to execute operations for instruction scheduling, the operations comprising:
receiving a sequence of instructions;
identifying data dependencies between instructions;
identifying a pattern of redundant flag-register read and/or write accesses based on dependency of the instructions; and
reordering the instructions based on data dependencies and ignoring the identified redundant flag-register access dependencies to reduce execution latency,
wherein the operation of reordering the instructions without being restricted by the redundant flag-register based dependency relationship further includes:
constructing a directed graph with vertexes and edges between the vertexes, the vertexes corresponding to instructions and the edges being latency labelled and corresponding to data dependencies and non-redundant flag dependencies; and
topology-sorting the directed graph according to a critical latency-oriented model to reduce an execution latency.

8. The non-transitory computer readable medium of claim 7, wherein the operation of identifying the redundant flag-register based dependency of the instructions further comprises:
identifying the redundant flag-register based dependency based on pre-determined patterns for flag-register access.

9. The non-transitory computer readable medium of claim 8, wherein the operation of identifying the redundant flag-register based dependency based on the pre-determined patterns for the flag-register access further comprises:
identifying two or more consecutive read flag-register accesses.

10. The non-transitory computer readable medium of claim 8, wherein the operation of identifying the redundant flag-register based dependency based on the pre-determined patterns for the flag-register access further comprises:
identifying three or more consecutive write flag-register accesses.

11. The non-transitory computer readable medium of claim 7, wherein the operations comprise:
receiving the sequence of instructions for compilation; and outputting compiled code corresponding to the re-ordered instructions.

12. The non-transitory computer readable medium of claim 7, wherein the operations comprise:
receiving the sequence of instructions for an execution; and
controlling the execution according to the re-ordered instructions.

13. An apparatus, comprising:
a processor configured to execute instructions; and
a memory configured to store instructions for causing the processor to:
receive a sequence of instructions;
identifying data dependencies between instructions;
identify a pattern of redundant flag-register read and/or write accesses based on dependency of the instructions; and
reorder the instructions based on data dependencies and ignoring the identified redundant flag-register access dependencies to reduce execution latency,
wherein the memory is configured to store the instructions for causing the processor to:
construct a directed graph with vertexes and edges between the vertexes, the vertexes corresponding to instructions and the edges being latency labelled and corresponding to data dependencies and non-redundant flag dependencies; and
topology-sort the directed graph according to a critical latency-oriented model to reduce an execution latency.

14. The apparatus of claim 13, wherein the memory is configured to store the instructions for causing the processor to:
identify the redundant flag-register based dependency based on pre-determined patterns for flag-register access.

15. The apparatus of claim 14, wherein the memory is configured to store the instructions for causing the processor to perform at least one of:
identifying two or more consecutive read flag-register accesses; and
identifying three or more consecutive write flag-register accesses.

16. The apparatus of claim 13, wherein the memory is configured to store the instructions for causing the processor to:
receive the sequence of instructions for compilation; and
generating compiled code corresponding to the re-ordered instructions.

17. The apparatus of claim 13, wherein the memory is configured to store the instructions for causing the processor to:
receive the sequence of instructions for an execution; and
execute the instructions according to the re-ordered instructions.

* * * * *